United States Patent [19]
McBride

[11] Patent Number: 5,671,408
[45] Date of Patent: Sep. 23, 1997

[54] NETWORK SUPPORT SYSTEM

[75] Inventor: Simon Timothy McBride, Clwyd, England

[73] Assignee: British Telecommunications public limited company, London, England

[21] Appl. No.: 297,870

[22] Filed: Aug. 30, 1994

[30] Foreign Application Priority Data

Mar. 16, 1994 [EP] European Pat. Off. .............. 94301878

[51] Int. Cl.$^6$ .............................. G06F 17/30; G06F 15/74
[52] U.S. Cl. ........................ 395/611; 395/604; 395/613; 395/614; 395/616; 395/620; 379/113; 379/34
[58] Field of Search .......................... 395/600; 364/200, 364/188; 379/34, 113; 370/60

[56] References Cited

U.S. PATENT DOCUMENTS

| | | | |
|---|---|---|---|
| 4,570,217 | 2/1986 | Allen et al. | 364/188 |
| 4,757,267 | 7/1988 | Riskin | 379/115 |
| 4,774,655 | 9/1988 | Kollin et al. | 364/200 |
| 5,249,181 | 9/1993 | Wang et al. | 370/60 |
| 5,255,305 | 10/1993 | Sattar | 379/34 |
| 5,403,639 | 4/1995 | Belsan et al. | 395/600 |

FOREIGN PATENT DOCUMENTS

WO 90/08360  7/1990  WIPO .

OTHER PUBLICATIONS

Cohen et al, "Unified Network Management From AT&T", AT & T Technical Journal 87 (1988), Nov./Dec. No. 6, Shirt Hills, NJ, US.

Managing Distributed Networks:Divide and Conquer, Data Communications, Jan. 1994, No. 1, New York, US.

Willetts, "Concert™ –an Initiative Towards Open Integrated Network Management", Computer Communications, 1990, No. 9, London, pp. 527–532.

"Distributed Network Management", Data Communications International, Jun. 1992, No. 9, New York, US.

"Network Manager Made-to-Measure", Telecom Report, May/Jun. 1993, No. 3, Munchen, DE and translation of same.

*Primary Examiner*—Thomas G. Black
*Assistant Examiner*—Cheryl Lewis
*Attorney, Agent, or Firm*—Nixon & Vanderhye P.C.

[57] ABSTRACT

A network support system accesses a plurality of databases, each storing information regarding a characteristic of the network. The network support system includes: a user interface having a graphical display device for accepting requests for information from a user, a selector means for selecting the appropriate database(s) for each request for information, and a plurality of database integrators, each associated with one of the databases, for receiving requests for information, interrogating the associated database, and sending information to the user interface. In use, the user interface combines information from a plurality of databases in accordance to the characteristics of the network represented by the information, and displays the combined information via the graphical display device. The network support system allows for improved planning management, or utilization of a network, in particular a telecommunications network.

32 Claims, 9 Drawing Sheets

Fig.2a  PROGRAM FLOW

| GUI | INTEGRATOR INS | INTEGRATOR GENETIC |
|---|---|---|
| 1. GUI started | | |
| 2. GUI checks configuration file to see which integrators this user requires | | |
| 3. Send message to start integrators | 4. INS integrator started by 'Tool talk' | 5. Genetic integrator started by 'Tool talk' |
| 8. If start replay successful continue | 6. INS integrator replies | 7. Genetic integrator replies |
| 9. If start replay successful continue | | |
| 10. User selects option to display circuits | | |
| 11. GUI calculates that this requires information from both integrators and asks for user ids and passwords for database applications | | |
| 12. Send log-on messages | 13. Attempt log-on to INS database | 14. Attempt log-on genetic database |
| 17. If successful continue | 15. Replay whether successful | 16. Replay whether successful |

Fig.2b

| GUI | INTEGRATOR INS | INTEGRATOR GENETIC |
|---|---|---|
| 18. If successful continue | | |
| 19. User inputs circuit to display | | |
| 20. GUI calculates which database circuit will be stored on, and sends message to corresponding integrator to gather data about circuit | | 21. Integrator gathers routing for circuit |
| 23. GUI interprets routing and displays geographical representation | | 22. Integrator returns routing of circuit |
| 24. GUI sends each section of routing to INS integrator to get more detailed information about 'physical' routing of circuit | 25. INS integrator processes requests | |
| 27. when user selects option to see physical routing of circui it is displayed geographically | 26. Interrogates INS and returns replies to messages | |

FIG. 5

TEXT INFO

Circuit Designation

| LS/ATLAS | WX/B | 2001 | FDA |

Serial No        Status Length

| HNE 17557 N/92 |   | 166 |

Routing

```
MR/R      - WX/B      8008   DK      2
LS/BAS/4A - MR/R      8008   DK      4
```

OK    ESC

NETWORK SUPPORT SYSTEM

FIELD OF THE INVENTION

The present application relates to a network support system, and in particular to a network support system for accessing, and displaying, information from a plurality of databases.

BACKGROUND OF THE INVENTION

All network operators, whether they are operators of a telecommunications network, an electricity network, a gas network, a railway network, or any other type of network, need to maintain records of their network. There are very many aspects of a network that need to be recorded, for example the geographical location of nodes and routes within the network, the nature of each route or node, the logical relationship between these nodes and routes, the users of the network, and their physical and logical location. This information of the different characteristics of the operators network are generally held on separate databases, so that all information on only a particular aspect of the network is located on one database. For example for a telecommunications network, all customer information may be held on one database, while all information regarding the physical routing of ducts will be on another database, information regarding the logical routing of transmission links of a specified bit rate e.g. 2 Mbit/s will be on a third database. These databases are valuable assets which in many cases are critical to the business of the network operator, and which have been assembled over many years. However their data structures and operations were designed to take full advantage of the performance efficiencies of database technology which was current at the time of their development, so that, in general these databases do not interwork. In some cases, due to the differing nature of the information to be stored, this may necessarily be the case, even if the databases are designed at the same time. The needs of the network operator that these databases were designed to satisfy are subject to change and additional requirements also arise, particularly from the demands of customers for network services to be provided more flexibly to meet their specific requirements.

Telecommunications networks are particularly complex because of the ability to multiplex many logical communications circuits onto one physical route. A modern digital telecommunications network comprises many logical communications circuits which are multiplexed together in accordance with a digital hierarchy. Thus a number of 64 Kbit communications links will be multiplexed together to form a 2 Mbit/s link, which will be further multiplexed to form an 8 Mbit/s link, and then a 34 Mbit/s link and so on to 565 Mbit/s or beyond. A single communications link from one customer at a first geographical location, to a second customer at a second geographical location will thus be multiplexed up, probably at a number of different nodes in the network, transmitted for a majority of its route as part of a high bit rate communications link, and then demultiplexed, again at a plurality of network nodes, and finally delivered as a single 64 Kbit link to the second customer's destination.

Thus a plurality of databases will need to be interrogated in order simply to determine the logical routing of a single communications link, or circuit, from one geographical location to another. If information on the physical routing of the circuit between nodes in the network is required a further, at least one, database will need to be interrogated. A particular requirement of customers from network operators, especially telecommunications network operators, is that of diversity and separacy of the routes of the network which supply them with the given network service. In a telecommunications network, diversity means that any two circuits do not share a common physical route over any part of their lengths, although they may share common network nodes. Separacy, in a telecommunication network, means that any two circuits do not share a common physical route, nor any common network nodes over the whole of their length. Many customers of telecommunication operators, having private digital networks (sold in the United Kingdom as "Kilostream" RTM and "Megastream" RTM), require separacy of the circuits forming their private digital network. Clearly emergency and military organisations desire separacy of their telecommunications networks to ensure that disruption of a single physical network route does not isolate them from communication. However, increasingly commercial organisations, such as banks and building societies, require the security of separacy so that, for example, central computer resources which need to be accessible at all times are not isolated. Telecommunications operators thus need to be able to determine whether separacy exists in a particular customer's private digital network, implement it if not in existence, and ensure its continued existence. Furthermore, since guaranteed separacy is often offered at a premium to customers by telecommunications operators, the operators need to clearly demonstrate to customers that the separacy for which they are being charged actually exists. This is a difficult task for the network manager of the telecommunications operator to achieve. To establish all the characteristics of a single circuit of the customer's digital private network, a plurality of databases, each with their distinct access, interrogation, and data formats must be consulted. The information from each database must be stored, for example, in writing, until all the necessary information from the different databases has been accumulated. Even once the network manager has got to this stage, the task of visualising the physical and logical connections of a customer's network from the amassed information is considerable. Furthermore, although the network manager of the telecommunications operator may be convinced of the separacy of the customer's network, it further remains to persuade the customer that his network does indeed have separacy, from the information amassed from the various of the telecommunications operators databases.

BRIEF DESCRIPTION OF THE INVENTION

According to the present invention there is provided a network support system for accessing a plurality of databases, each storing information regarding a characteristic of the network, the network support system comprising:

user interface means having a graphical display device and means for accepting requests for information from a user, selection means for selecting the appropriate database(s) for each request for information, and a plurality of data acquisition means, each associated with one of the databases, for receiving requests for information, interrogating the associated database, and sending information to the user interface means, wherein, in use, the user interface means combines information from a plurality of databases in accordance to the characteristics of the network represented by the information, and displays the combined information via the graphical display device.

The present invention thus provides a network support system which allows for improved planning, management, or utilisation of a network. A network manager employing a network support system according to the present invention can access information from a plurality of databases via a single user interface. The provision of data acquisition means, or integrators, associated with each of the databases, ensures that neither the network manager nor the user interface need be concerned with the differing details of how to acquire information from the various databases. Moreover since the information gathered from the plurality of databases is combined by the user interface in accordance to the characteristics of the network represented by the information, for example in accordance to the circuit number for a private digital network circuit, and displayed via the graphical display device, the network manager is able to visualise a number of aspects of the network from a single display. For example information on the logical path of a circuit may be displayed together with information on the physical routing of the same circuit, even though this information is stored on different databases.

Preferably the graphical display device displays the combined information in a geographical form, for example displaying a geographical map of the region of the country in which the network is, which shows the geographical location of the nodes of the network, and the physical and logical routes between these nodes. Such a display allows the network manager rapidly and intuitively to assimilate complex information regarding the network and to rapidly make decisions concerning the management, utilisation or planning of the network. Furthermore such displays are easily understood by customers of the network operator who may be shown examples of the diversity or separacy within their private digital networks.

Although a copy of the information held by the plurality of databases may be maintained by the network support system (for example to allow faster access to the information), preferably a copy of information regarding the network is not maintained by the network support system. This ensures that the information displayed via the network support system is "live" i.e. it is as up-to-date as the information the network manager, or other user of the network support system, would acquire if he accessed the database directly. Thus, although in some applications, for example network planning, where timescales are relatively long, there is no disadvantage in storing information from the databases, the ability of the network support system to access live information enables the system to be utilised in roles where it is essential that the latest information available is utilised. For example when allocating bandwidth from within a high capacity link, or bearer, to a customer the latest information concerning spare capacity on a particular bearer is required, to avoid the risk of the required capacity no longer being available.

In one embodiment of the present invention the selection means form a part of the user interface means.

Alternatively the selection means may be distinct from the user interface means. In this case the selection means may be located remote from the user interface, which need hold no information concerning the location of information within each of the databases. The user interface, having received a request from the network manager, or other user, would then request information from the selection means, without needing to specify the database which holds the relevant information. Furthermore this arrangement means that if information is moved between the databases, only the selection means needs to be updated to accommodate the new location of the information. The effect of this, as seen by the user interface, is that of a single logical database which is physically distributed across a plurality of databases.

Preferably the network support system is able to accept and display new information entered into a database without needing a request, from the user of the network support system, to display such information. In this way the network support system is able to monitor aspects of the network, for example to ensure that once separacy between two circuits within the network has been established, it is maintained.

Advantageously new information regarding the network may be input to a database via the network support system. This enables the network manager not only to view information regarding the network, but also to correct such information, or to add further information.

Preferably the network support system also comprises at least one processing means, distinct from the user interface means, which receives requests from the user interface means and information from the data acquisition means, and sends processed information to the user interface means via a messaging protocol. The provision of separate processing means prevents the user interface from becoming over burdened with specific processing tasks, for example the calculation of the shortest network route between two geographical locations. The network support system may comprise a plurality of user interface means, and if provided with processing means, each of the user interfaces may access the processing means which would preform a specialised processing function for the user interface. This provides flexibility in the design of the network support system, since processing means can be added to, or altered, without affecting the user interface means.

BRIEF DESCRIPTION OF THE DRAWINGS

Embodiments of the present invention will now be described, by way of example only, with reference to the accompanying figures, in which:

FIGS. 2a and 2b are a schematic diagram showing the program flow during a particular operation session of a network support system according to the present invention.

FIGS. 4 to 8 show prints of screen displays from a network support system according to the present invention.

DESCRIPTION OF THE PREFERRED EMBODIMENTs

Figure 1:
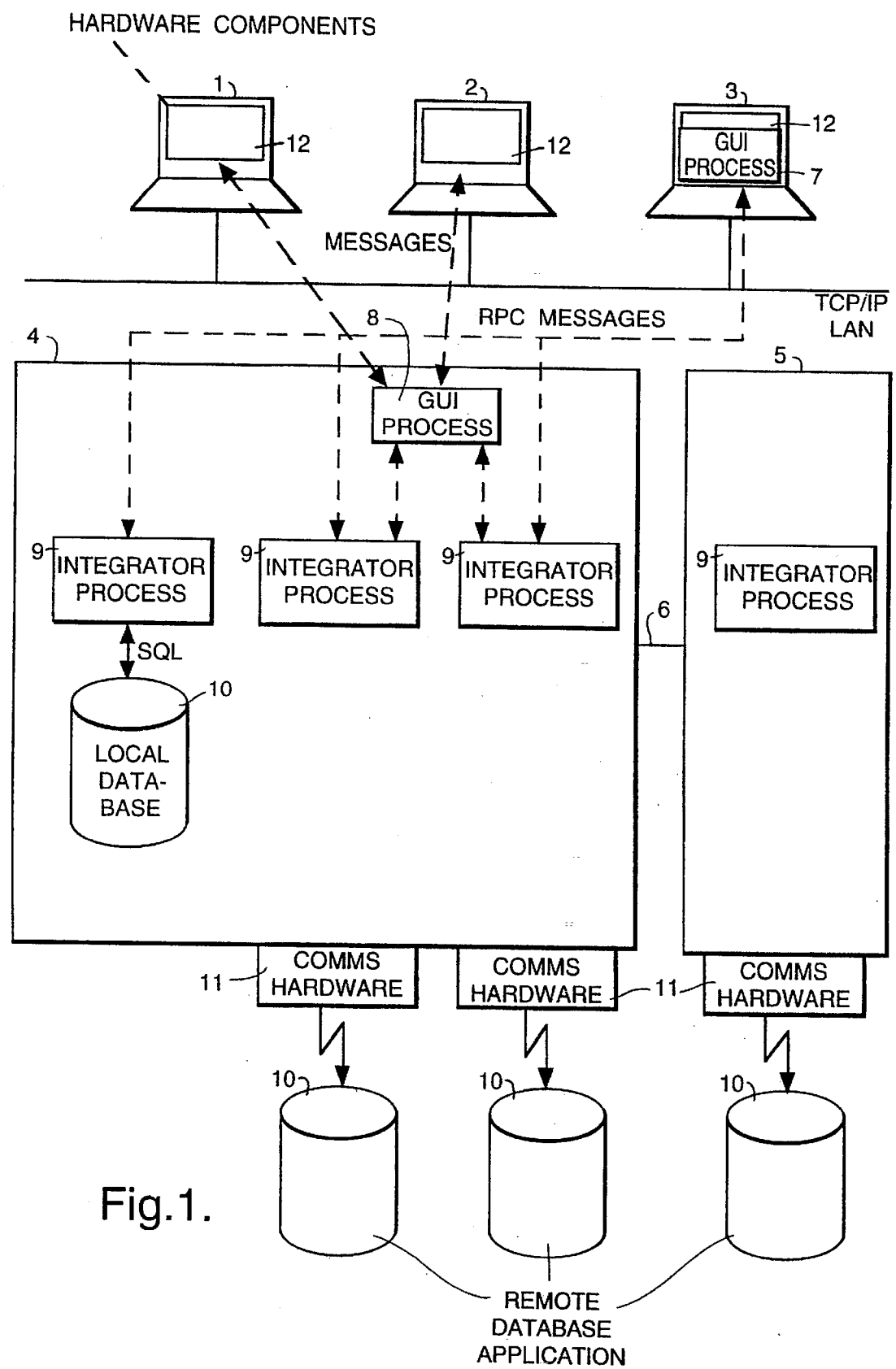
FIG. 1 is a schematic diagram of a network support system according to the present invention.

With reference to FIG. 1, the users terminal can be either a PC 1, an X terminal 2 or a UNIX workstation 3 (SUN IPC). Each terminal type 1, 2, 3 has a screen 12, for displaying graphical images. The terminals 1, 2, 3 are connected to a UNIX machine 4 (SUN Sparc 10) via a TCP/IP LAN connection, and the UNIX machine 4 is connected to a further UNIX machine 5 via either LAN or WAN connections 6. When the network manager, or user, employs a UNIX workstation 3 as a terminal then a GUI (Graphical User Interface) process 7 runs on that workstation. The GUI is an "X-Windows" GUI conforming to the Motif style guide, with additional data representation provided by "Data Views" from VI Corp. When a PC 1 is employed a GUI process 8 runs on the UNIX machine 4 and the X protocol is employed to display the results of the GUI on the user's PC 1 or X terminal 2. The data acquisition means of the network support system is implemented via integrator processes 9, running on the UNIX machines 4 and 5. Each integrator process 9 is responsible for communicating with a single database 10, the database 10 can either be locally held on the UNIX machine 4, or located remote from the UNIX machine. If the database 10 is located remotely the UNIX machine 4 communicates with the database 10 via comms equipment 11, e.g. X25.

Integrator processors 9 communicate with the GUI process 8 is using the RPC (Remote Procedure Call) messaging protocol. The version of RPC employed is from the "Tooltalk" package which is produced, and sold, by SUN Microsystems. If access to an integrator process 9 on UNIX machine 5 is required, connectivity is provided via a TCP/IP WAN mechanism.

A typical session for the network support system would be as follows. The user invokes the GUI process 7 or 8 by clicking on an on screen icon. This runs the GUI process 7 or 8 on either the users own workstation 3 or on the UNIX machine 4. The GUI process 7 or 8 checks its configuration files to see which integrator 9 is required for this particular user. The GUI process 7 or 8 then sends out a start message to start the various integrators 9 for this particular version of the support system. The integrators 9 in turn, when started, check that they have their connectivities to the database 10 that they are associated with, and reply back to the GUI 7 or 8 to inform it of their success or failure in performing that operation. The GUI 7 or S then displays whether the integrators 9 were successful or not in starting up.

The integrator processes 9 can use a variety of mechanisms to access information from the databases 10 including SQL (Standard Query Language), screen scrapping or by driving existing report mechanisms on the database 10. After the initialisation of the GUI 7 or 8 and integrators 9 is complete, the user is then able to perform various operations using the network support system. As the user requests certain functions, the GUI 7 or 8 will determine whether connectivity is then needed to particular integrated processes 9, may request a log-on, user id and password for a particular database 10. Following successful completion of the log-on procedure the user is then able to drive the necessary functions within the GUI 7 or 8 to access information from the databases 10, manipulate that information, and also write information back to the databases. When the user decides to terminate the network support system session, the GUI 7 or 8 sends out messages to the various integrators 9 to tell them to shut down. The GUI 7 or 8 itself then shuts down.

The design of the system is modular and generic, different users of the network support system will use different combinations of integrators to gain the desired information, and combine it in the desired way.

Figure 3:
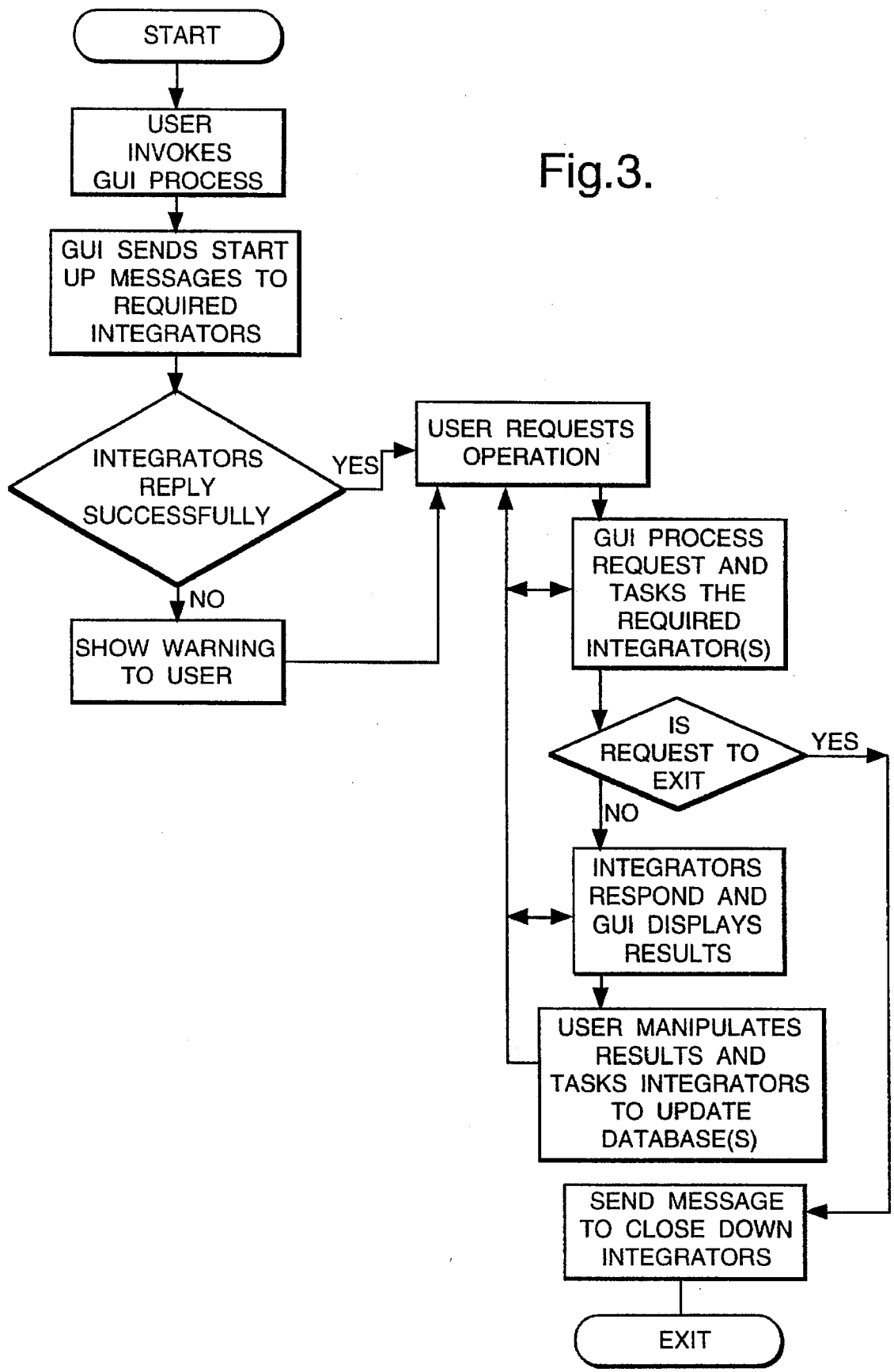
FIG. 3 is a flow diagram for the operation of a network support system according to the present invention.

A typical example of the program flow for a session will now be described with reference to FIGS. 2a, 2b and 3. The user starts the GUI 7 process, shown as step 1 in FIG. 2a. The GUI then checks its configuration files shown as step 2 in FIG. 2a, to see which integrators 9 are required. The configuration file is used to determine which integrators 9 are needed by this particular class of user. Different groups of users will use different integrator processors 9 to give them a specific network support system session. This permits the design of system to be very generic, allowing one single system to be developed which is then simply configured at run time by either developers or users alike.

In the present exemplified session the user requires access to a telecommunication operator's digital hierarchy database 10, known as INS, and also to the private digital circuit, "Kilostream" RTM, product database 10, known as GENETIC.

The INS database holds the physical routing information for all of the operator's digital network, whereas the GENETIC database holds information relating to which Kilostream configurations particular customers of the operator have. Once the GUI 7 has decided which integrator processes 9 are required it sends RPC messages via the Tooltalk messaging protocol to instigate the necessary integrator processes 9.

The integrators 9 once successfully started, reply. The user is now able to perform various functions from the GUI 7. When the user requests certain operations which require access to particular databases 10 controlled by the integrators 9, the GUI 7, knowing which database 10 stores each type of information, will request user id and passwords for the appropriate database(s) 10, so that the user can gain access to those databases. This process is shown by steps 10 through to 18 of FIG. 2a and 2b. Assuming the user has been successful in logging into the various databases via the integrator processes 9, he is now able to continue and perform the operations he requires.

In step 19 the user enters a circuit designation into the GUI 7, and the GUI 7 determines which database integrator 9 it needs to send a message to, in order to gain the information. This involves communication between the GUI 7 process, and an integrator process 9. The integrator process 9, will then interrogate its associated remote database 10, and will return the relevant information for that particular circuit via an RPC message to the GUI 7 process. The GUI 7 process will then graphically display the routing of the circuit on the screen 12 of the terminal 1, 2, 3. This process is shown in steps 20 through to 23 of FIG. 2b.

Whilst the user is interpreting this information, the GUI 7 predicts the further information required by the user and requests other integrator processes 9 for information about the physical routing of the circuit. In this example steps 24 through to 26, of FIG. 2b show the GUI 7 sending each section of the routing, which was returned from the GENETIC integrator, to the INS integrator to find its physical attributes. The INS integrator in turn responds with messages after interrogating the INS database. Now when the user selects an option to see the physical routing of the circuit it is displayed on the screen 12 by the GUI 7. Thus information from both GENETIC and INS has now been combined into one single view of the circuit.

Figure 4:
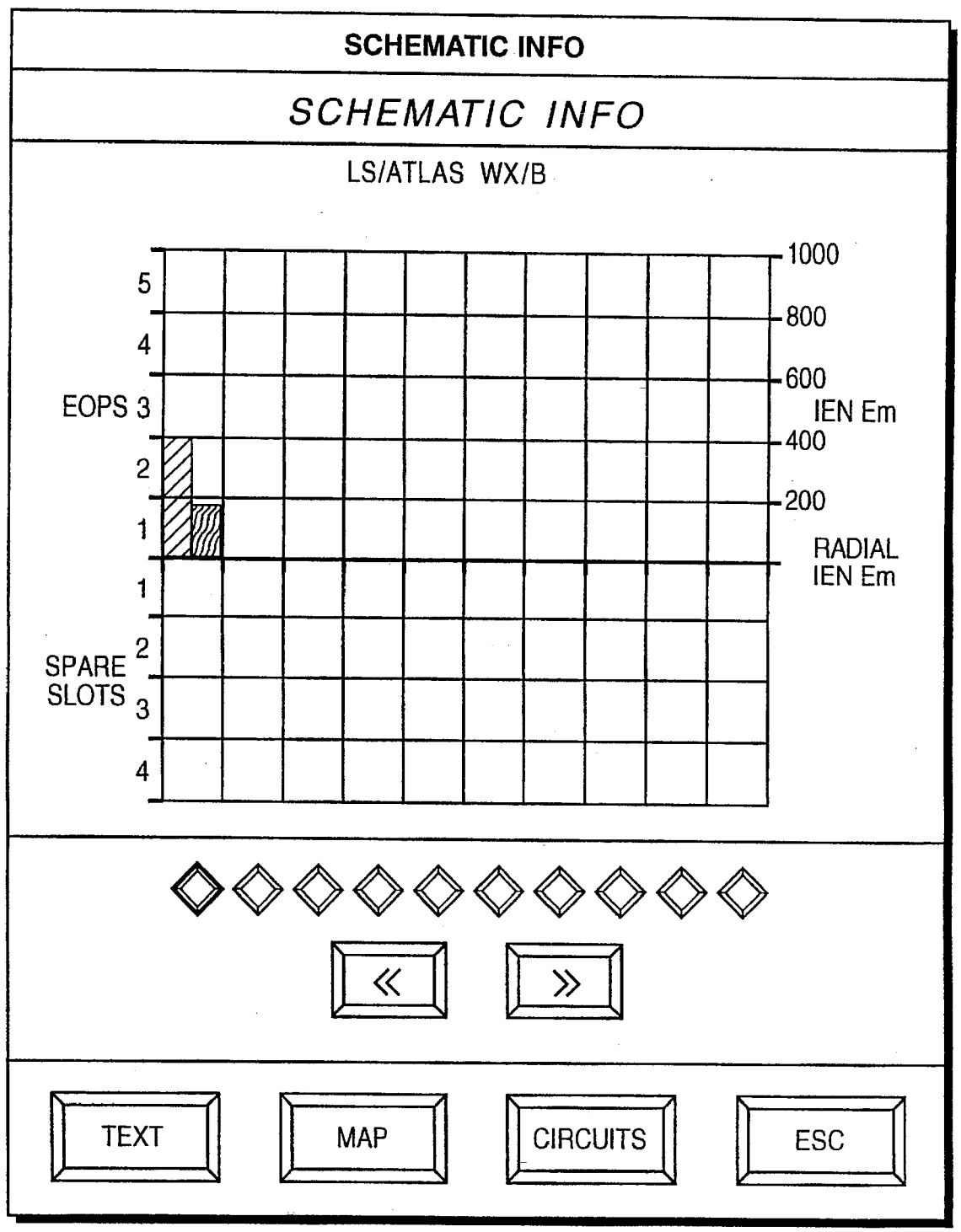
Figure 6:
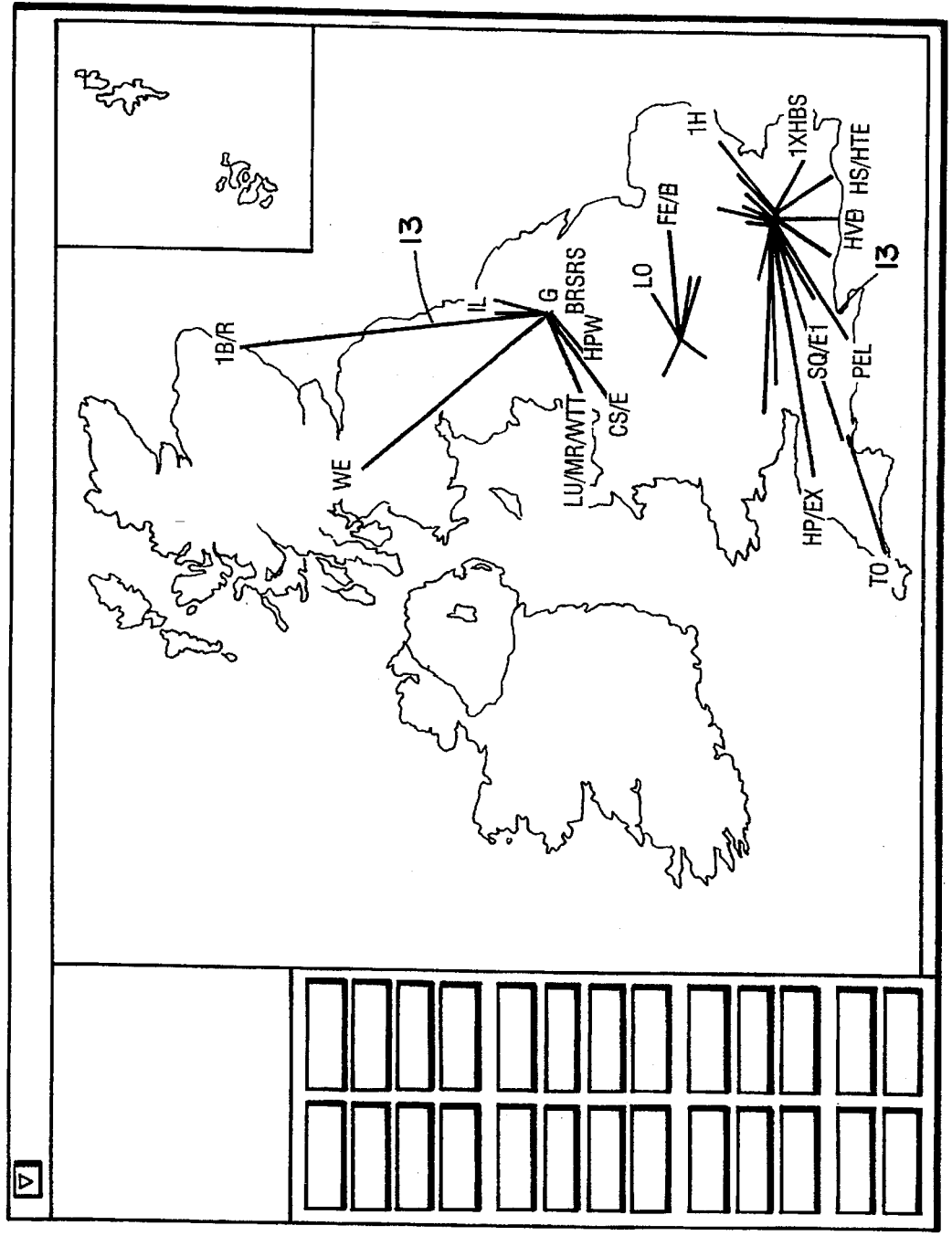
Figure 7:
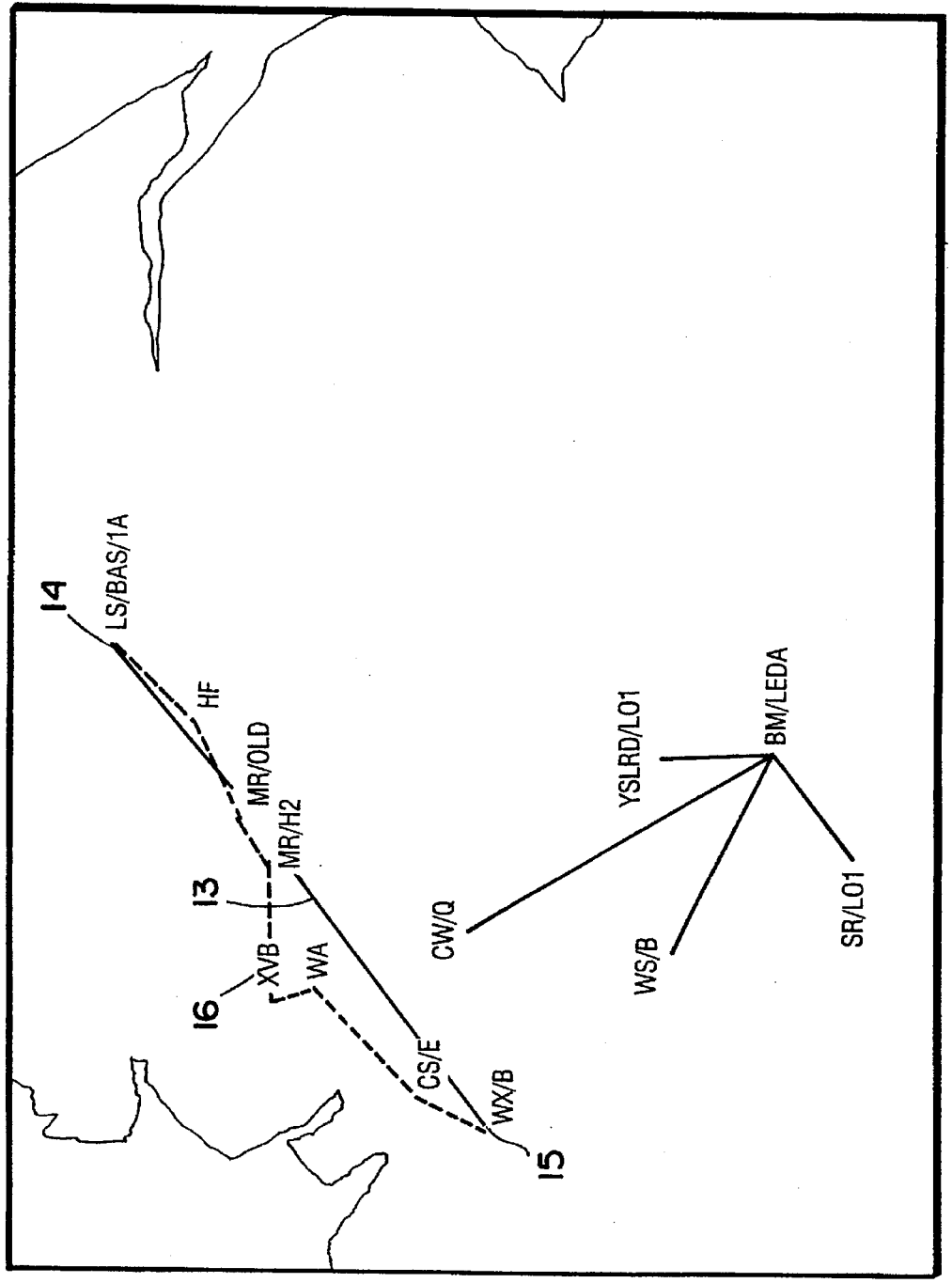
Figure 8:
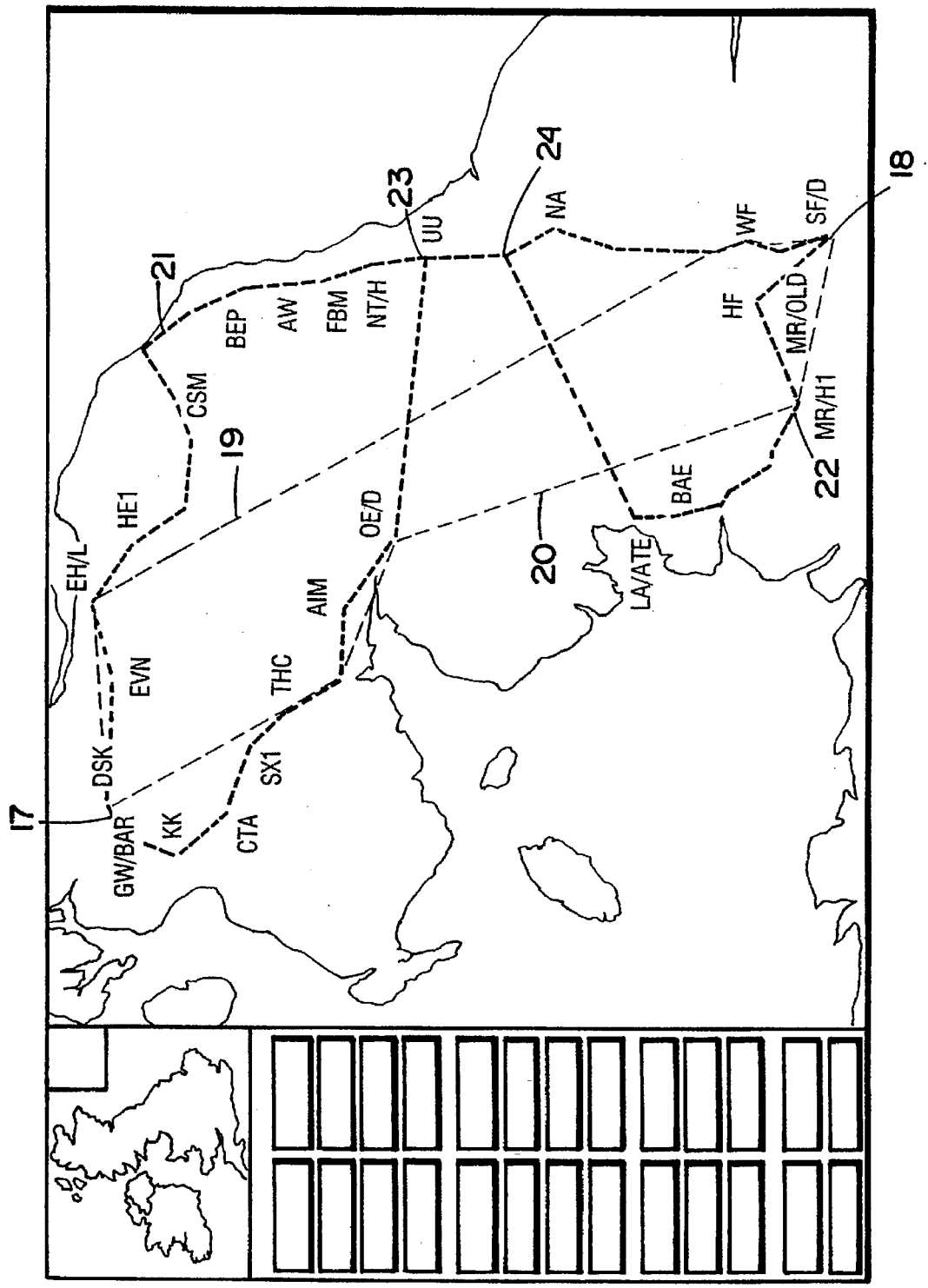

FIGS. 4 to 8 show prints of the screen display from the network support system. FIG. 4 is an example of the schematic display of information, while FIG. 5 shows the displayed information in textual form. FIG. 6 shows the display of information in geographical form. FIG. 6 shows an outline map of the United Kingdom with all the logical routes 13 of a particular customer's private digital network. This information is all stored on the GENETIC database. FIG. 7 shows a geographical display of part of a customer's private digital network in the north of the United Kingdom. The logical route 13 between two network nodes 14 and 15, is shown, and furthermore the physical routing 16 between the same two nodes 14 and 15 is also shown. The information for the physical routing has been acquired from the INS database. FIG. 8 shows part of a customer's private digital network, which, from the logical routes 19 and 20, would seem to have separacy between the network nodes 17 and 18. However, when the logical routing information from GENETIC, is combined with the physical routing information, from INS, it can be seen that the two physical routings 21 and 22 between the network nodes 17 and 18 actually share a common physical path between the network nodes 23 and 24. Thus the apparent separacy shown by the logical routing diagram does not in fact exist. By combining the information from the physical routing database with that from the logical routing database in a geographical form on a single display, the network manager can quickly appreciate this problem and resolve it.

The exact format of information in different databases is not always consistent. The network support system, therefore, must resolve these differences in order to take information from one database and input it into another, to gain an overall integrated result. The support system also has to deal with any data inconsistencies between databases for whatever reason, e.g. the databases may be out of step, having being updated at different times, or there maybe incorrect information in one of the databases. It is not possible for the support system to deal with every conceivable data inconsistency, therefore when a data inconsistency is detected, the system flags this to the user. The users can then investigate this problem, and rectify any data inconsistencies on the appropriate databases.

I claim:

1. A support system for a telecommunications network which provides communication channels between locations, the system comprising:

a plurality of databases which store route specifications for the respective channels and information about the physical paths taken by the channels between successive locations on the routes specified in the corresponding route specifications, the route specifications and the information about the physical paths being stored in different databases;

a respective data acquisition means associated with each of the databases, for receiving requests for specific data stored in its associated database, interrogating its associated database in response to receipt of such requests, and outputting the requested specific data;

user interface means having a graphical display device and input means which permits the inputting to the system of user requests, each identifying a said channel, for information about the route specification of that channel and the physical path taken by that channel between each pair of successive locations on the route specified in the route specification;

selection means for selecting the databases in which the data corresponding to the information requested in an inputted user request is stored and directing requests for this data to the data acquisition means associated with these databases; and combining means for combining the data outputted by the data acquisition means in response to the inputted user request and displaying the route specification and the physical path taken by the channel between each pair of successive locations on the route specified in the route specification as a single graphical display via the display device.

2. A system as claimed in claim 1, wherein the combining means is arranged to display the specified logical and physical routes in the form of a map.

3. A system as claimed in claim 1, wherein said selection means form part of the user interface means.

4. A system as claimed in claim 1, wherein the selection means is arranged to respond to the inputting of a user request by directing a request for the route specification of the channel identified in the user request to the data acquisition means associated with the database in which this route specification is stored, and to respond to the outputting of this route specification by directing a respective request for information about the physical path taken by the channel between each pair of successive locations on the outputted route specification to the data acquisition means associated with the database in which that information is stored.

5. A system as claimed in claim 4, wherein said selection means form part of the user interface means.

6. A system as claimed in claim 4, wherein the combining means is arranged to display the route specification and the physical path taken by the channel between each pair of successive locations on the route specified in the route specification in the form of a map.

7. A system as claimed in claim 1, wherein the combining means is arranged to display the route specification and the physical path taken by the channel between each pair of successive locations on the route specified in the route specification in the form of a map.

8. A system as claimed in claim 7 wherein the combining means is arranged to display the route specifications and the physical paths in response to user requests for at least two channels between the same two locations such that diversity or separacy of two physical paths between the two locations can be ascertained.

9. A support system for a telecommunications network which provides communication channels between locations, the system comprising:

a plurality of databases which store route specifications for the respective channels and information about the physical paths taken by the channels between successive locations on routes specified in the corresponding route specifications, the route specifications and the information about the physical paths being stored in different databases;

a respective data acquisition means associated with each of the databases, for receiving requests for specific data stored in its associated database, interrogating its associated database in response to receipt of such requests, and outputting the requested specific data;

user interface means having a graphical display and input means which permits the inputting to the system of user requests, each identifying a said channel, for information about the physical route of that channel;

selection means for selecting the databases in which the route specification of the channel identified in an inputted user request and the information about the physical path taken by that channel between each pair of successive locations on the route specified in the route specification are stored, responding to the inputting of a user request by directing a request for the route specification of the channel identified in the inputted user request to the data acquisition means associated with the database in which this route specification is stored, and responding to the outputting of this route specification by directing a respective request for information about the physical path taken by the channel between each pair of successive locations on the route specified in the route specification to the data acquisition means associated with the database in which that information is stored; and combining means for combining the data outputted by the data acquisition means in response to the said respective requests directed to the data acquisition means in response to first and second inputted user requests and displaying the physical paths of the channels identified in these user requests as a single graphical display via the display.

10. A system as claimed in claim 9, wherein the selection means forms part of the user interface means.

11. A system as claimed in claim 9, wherein the combining means is arranged to display the physical paths of the identified channels in the form of a map.

12. A system as claimed in claim 11, wherein the selection means forms part of the user interface means.

13. A system as claimed in claim 11, wherein the combining means is arranged to display the route specifications and the physical paths in response to first and second user requests for two channels between the same two locations such that diversity or separacy of two physical paths between the two locations can be ascertained.

14. A system as claimed in claim 9, wherein the selection means forms part of the user interface means.

15. A telecommunications network support system for displaying a logical diagram of routes between geographic locations and the physical paths between geographic locations comprising:

a user terminal including an interactive input means for a user to input requests and a graphical display device for displaying logical diagrams of routes and physical paths;

a plurality of databases wherein one of the databases stores data specifying logical routes between locations and another one of the databases stores data specifying the physical paths between locations;

a data acquisition means associated with each database for receiving requests for data stored in its associated database, interrogating its associated database in response to receipt of such a request, and outputting requested specific data;

a processor for receiving user entered requests from the user terminal, directing the requests to the data acquisition means associated with the databases, receiving specific data outputted from the data acquisition means, and forwarding the specific data outputted to the user terminal for display on the graphical display device; and whereat in response to a user request for a communication channel between two geographic locations, a logical diagram of the route and a physical path between the two geographic locations are displayed on the graphical display device.

16. A support system as in claim 15, wherein in response to a user request for two communication channels between the said two geographic locations, logical diagrams of the routes and the physical paths between the two geographic locations are displayed whereby diversity and separacy may be ascertained.

17. A method for supporting a telecommunications network which provides communication channels between locations, the method comprising:

storing route specifications for the respective channels and information about the physical paths taken by the channels between successive locations on the routes specified in the corresponding route specifications in a plurality of respective databases, the route specifications and the information about the physical paths being stored in different databases;

receiving requests for specific data stored in its associated database, interrogating its associated database in response to receipt of such requests, and outputting the requested specific data using a respective data acquisition means associated with each of the databases;

providing a graphical display device and input which permits the inputting user requests, each identifying a said channel, for information about the route specification of that channel and the physical path taken by that channel between each pair of successive locations on the route specified in the route specification;

selecting the databases in which the data corresponding to the information requested in an inputted user request is stored and directing requests for this data to the data acquisition means associated with these databases; and combining the data outputted by the data acquisition means in response to the inputted user request and displaying the route specification and the physical path taken by the channel between each pair of successive locations on the route specified in the route specification as a single graphical display via the graphical display device.

18. A method as in claim 17, wherein the selecting step:

responds to the inputting of a user request by directing a request for the route specification of the channel identified in the user request to the data acquisition means associated with the database in which this route specification is stored, and responds to the outputting of this route specification by directing a respective request for information about the physical path taken by the channel between each pair of successive locations on the outputted route specification to the data acquisition means associated with the database in which that information is stored.

19. A method as in claim 18, wherein the combining step displays the route specification and the physical path taken by the channel between each pair of successive locations on the route specified in the route specification in the form of a map.

20. A method as in claim 18, wherein said selecting step includes use of the user interface.

21. A method as in claim 17, wherein the wherein the combining step displays the specified logical and physical routes in the form of a map.

22. A method as in claim 17 wherein said selecting step includes use of the user interface.

23. A method as in claim 17, wherein the combining step displays the route specification and the physical path taken by the channel between each pair of successive locations on the route specified in the route specification in the form of a map.

24. A method as in claim 23 wherein the combining step displays the route specifications and the physical paths in response to user requests for at least two channels between the same two locations such that diversity or separacy of two physical paths between the two locations can be ascertained.

25. A method of supporting a telecommunications network which provides communication channels between locations, the method comprising:

storing route specifications for the respective channels and information about the physical paths taken by the channels between successive locations on routes specified in the corresponding route specifications in a plurality of databases, the route specifications and the information about the physical paths being stored in different databases;

receiving requests for specific data stored in its associated database, interrogating its associated database in response to receipt of such requests, and outputting the requested specific data using a respective data acquisition means associated with each of the databases;

providing a graphical display and input which permits the inputting to the system of user requests, each identifying a said channel, for information about the physical route of that channel;

selecting the databases in which the route specification of the channel identified in an inputted user request and the information about the physical path taken by that channel between each pair of successive locations on the route specified in the route specification are stored, responding to the inputting of a user request by directing a request for the route specification of the channel identified in the inputted user request to the data acquisition means associated with the database in which this route specification is stored, and responding to the outputting of this route specification by directing a respective request for information about the physical path taken by the channel between each pair of successive locations on the route specified in the route specification to the data acquisition means associated with the database in which that information is stored; and combining the data outputted by the data acquisition means in response to the said respective requests directed to the data acquisition means in response to first and second inputted user requests and displaying the physical paths of the channels identified in these user requests as a single graphical display.

26. A method as in claim 25, wherein the selecting step includes use of part of the user interface.

27. A method as in claim 25, wherein the combining step displays the physical paths of the identified channels in the form of a map.

28. A method as in claim 27, wherein the selecting step includes use of the user interface.

29. A method as in claim 27, wherein the combining step displays the route specifications and the physical paths in response to first and second user requests for two channels between the same two locations such that diversity or separacy of two physical paths between the two locations can be ascertained.

30. A method as in claim 25, wherein the selecting step includes use of the user interface.

31. A method for supporting a telecommunications network system by displaying a logical diagram of routes between geographic locations and the physical paths between geographic locations, said method comprising:

providing a user terminal including an interactive input for a user to input requests and a graphical display device for displaying logical diagrams of routes and physical paths;

maintaining a plurality of databases wherein one of the databases stores data specifying logical mutes between locations and another one of the databases stores data specifying the physical paths between locations;

receiving requests for data stored in its associated database, interrogating its associated database in response to receipt of such a request, and outputting requested specific data using a data acquisition means associated with each database;

receiving user entered requests from the user terminal, directing the requests to the data acquisition means associated with the databases, receiving specific data outputted from the data acquisition means, and forwarding the specific data outputted to the user terminal for display on the graphical display device; and in response to a user request for a communication channel between two geographic locations, displaying a logical diagram of the route and a physical path between the two geographic locations on the graphical display device.

32. A method as in claim 31, wherein, in response to a user request for two communication channels between the said two geographic locations, logical diagrams of the routes and the physical paths between the two geographic locations are displayed whereby diversity and separacy may be ascertained.

* * * * *